United States Patent
Yun et al.

(10) Patent No.: US 10,043,458 B2
(45) Date of Patent: Aug. 7, 2018

(54) DISPLAY APPARATUS FOR CHANGING COLOR DISTRIBUTION OF LIGHT GENERATED BY DISPLAY AND METHOD THEREOF

(71) Applicant: SAMSUNG ELECTRONICS CO., LTD., Suwon-si (KR)

(72) Inventors: Sang-un Yun, Gimpo-si (KR);
Gae-youn Kim, Seongnam-si (KR);
Sang-hoon Lee, Suwon-si (KR);
Jun-ho Jung, Seongnam-si (KR);
Tae-young Huh, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/162,090

(22) Filed: May 23, 2016

(65) Prior Publication Data

US 2016/0267852 A1    Sep. 15, 2016

Related U.S. Application Data

(62) Division of application No. 13/917,093, filed on Jun. 13, 2013, now Pat. No. 9,373,303.

(30) Foreign Application Priority Data

Jun. 13, 2012 (KR) .......................... 10-2012-0063054

(51) Int. Cl.
*G09G 3/30* (2006.01)
*G09G 3/34* (2006.01)
(Continued)

(52) U.S. Cl.
CPC ............. *G09G 3/3413* (2013.01); *G06T 7/90* (2017.01); *G09G 3/2003* (2013.01);
(Continued)

(58) Field of Classification Search
CPC .................................................. G09G 3/3413
(Continued)

(56) References Cited

U.S. PATENT DOCUMENTS

2003/0169354 A1    9/2003 Aotsuka
2009/0256916 A1   10/2009 Tanaka
(Continued)

FOREIGN PATENT DOCUMENTS

| JP | 2003-259380 A | 9/2003 |
| JP | 2010-103607 A | 5/2010 |
| JP | 2012-47827 A | 3/2012 |

OTHER PUBLICATIONS

Communication issued by the Korean Intellectual Property Office dated Feb. 9, 2018 in counterpart Korean Patent Application No. 10-2012-0063054.

*Primary Examiner* — Long D Pham
(74) *Attorney, Agent, or Firm* — Sughrue Mion, PLLC

(57) ABSTRACT

A display apparatus and a control method which displays an image based on an image signal transmitted from the outside are provided. The display apparatus includes a display which generates light in a plurality of colors and displays an image; a signal receiver which receives an image signal; a signal processor which processes the received image signal in order to display an image based on the image signal; and a controller which analyzes the image signal received by the signal receiver and obtains color reproduction feature information of the image signal, and changes each color distribution of light generated by the display to display an image in a color which corresponds to the color reproduction feature information obtained, based on the image signal.

18 Claims, 5 Drawing Sheets

(51) Int. Cl.
    *G09G 5/02*         (2006.01)
    *G09G 3/20*         (2006.01)
    *G09G 3/3208*     (2016.01)
    *G06T 7/90*         (2017.01)

(52) U.S. Cl.
    CPC ............ *G09G 3/3208* (2013.01); *G09G 5/02* (2013.01); *G09G 2320/0606* (2013.01); *G09G 2320/0613* (2013.01); *G09G 2320/0666* (2013.01); *G09G 2320/103* (2013.01); *G09G 2360/144* (2013.01)

(58) Field of Classification Search
    USPC .................................................... 345/77, 88
    See application file for complete search history.

(56) References Cited

U.S. PATENT DOCUMENTS

| | | | |
|---|---|---|---|
| 2010/0013872 A1 | 1/2010 | Masuda | |
| 2012/0013635 A1 | 1/2012 | Beeman et al. | |
| 2012/0050352 A1 | 3/2012 | Baba et al. | |
| 2012/0113279 A1* | 5/2012 | Park | H04N 5/23296 |
| | | | 348/208.6 |
| 2012/0242564 A1 | 9/2012 | Morishita | |
| 2012/0320036 A1* | 12/2012 | Kang | G09G 3/36 |
| | | | 345/419 |

\* cited by examiner

DISPLAY APPARATUS FOR CHANGING COLOR DISTRIBUTION OF LIGHT GENERATED BY DISPLAY AND METHOD THEREOF

CROSS-REFERENCE TO RELATED APPLICATION

This application is a Divisional Application of U.S. patent application Ser. No. 13/917,093, filed Jun. 13, 2013 in the U.S. Patent and Trademark Office, which claims priority from Korean Patent Application No. 10-2012-0063054, filed on Jun. 13, 2012 in the Korean Intellectual Property Office, the disclosure of which is incorporated herein by reference, in its entirety.

BACKGROUND

Field

Methods and apparatuses consistent with the exemplary embodiments relate to a display apparatus and a control method thereof which displays an image based on an image signal transmitted from the outside. More particularly, the inventive concept relates to a display apparatus and a control method thereof which improves a color reproduction structure of an image to be displayed.

Description of the Related Art

A display apparatus processes an image signal input from an external image supply source and displays an image on its display panel. The display apparatus may be implemented as a liquid crystal display (LCD), based on the processed image signal. The display apparatus scans a scanning line on the panel, including image information to display an image on the panel, and the scanning lines which have been scanned are sequentially arranged on the panel to form a single image frame.

The display panel of the display apparatus may be classified into a light-receiving panel and a light-emitting panel depending on the light generating method being implemented. The light-receiving panel does not emit light by itself, and thus includes an additional backlight which generates and supplies light to the panel. For example, an LCD panel may be implemented as the light-receiving panel. The light-emitting panel emits light and thus does not require an additional backlight. For example, an organic light emitting diode (OLED) panel may be implemented as the light-emitting panel.

With respect to the above display panel, color reproduction features such as color temperature are set in advance. Accordingly, the display panel displays an image on its panel according to the preset color reproduction feature of the panel, which is based on the processed image signal.

SUMMARY

The foregoing and/or other aspects may be achieved by providing a display apparatus including: a display which generates light in a plurality of colors and displays an image; a signal receiver which receives an image signal; a signal processor which processes the received image signal to display an image based on the image signal; and a controller which analyzes the image signal received by the signal receiver and obtains color reproduction feature information of the image signal, and changes each color distribution of light generated by the display to display an image in a color which corresponds to the obtained color reproduction feature information, based on the image signal.

The display may include a display panel which emits light by itself with light emitting elements per color which generate light in RGB colors, and the controller may control a light emitting level of each light emitting element per color which corresponds to the obtained color reproduction feature information.

The controller may analyze the color reproduction feature information of the image signal based on a pixel value of a frame of the image signal.

The controller may obtain the color reproduction feature information of the image signal from meta information of the image signal.

The color reproduction feature information may include a color temperature.

The color reproduction feature information may further include a color gamut, within which the color temperature is designated.

The color reproduction feature information of the image signal may be determined by an electronic device which generates the image signal by photographing an image and by a light state in the environment in which the photography is conducted.

Another aspect of the inventive concept may be achieved by providing a method of controlling a display apparatus including: receiving an image signal; obtaining color reproduction feature information of the image signal through analysis of the received image signal; changing each color distribution of light generated by a display, which generates a plurality of color lights and displays an image thereon, to display an image in a color which corresponds to the obtained color reproduction feature information, based on the image signal.

The display may include a display panel which emits light with a light emitting element per color, which generates light in RGB colors, and the changing each color distribution of the light generated by the display may include controlling each light emitting level of the respective light emitting elements per color which corresponds to the obtained color reproduction feature information.

The obtaining the color reproduction feature information of the image signal through analysis of the image signal may include analyzing the color reproduction feature information of the image signal based on a pixel value of a frame of the image signal.

The obtaining the color reproduction feature information of the image signal through analysis of the image signal may include obtaining the color reproduction feature information of the image signal from meta information of the image signal.

The color reproduction feature information may include a color temperature.

The color reproduction feature information may further include a color gamut, within which the color temperature is designated.

The color reproduction feature information of the image signal may be determined by an electronic apparatus which generates the image signal by photographing an image, and a light state of an environment in which the photographing has been conducted.

An exemplary embodiment may further provide a display apparatus having: a signal processor which processes an image signal to obtain the color temperature of consecutive first and second frames; and a controller which determines a difference between the obtained color temperatures, compares the differences to preset values, and adjusts a color distribution of a display based on the comparison between the color temperatures and the preset values. The controller may analyze the color temperature of the consecutive first and second frames of the image signal based on a pixel value of a frame of the image signal. The controller may obtain the color temperature of the consecutive first and second frames of the image signal from meta information of the image signal. The color temperature of the consecutive first and second frames may come from a color gamut, within which the color temperature is designated.

An exemplary embodiment may further provide a method of controlling a display apparatus, the method including: processing a received image signal to obtain color temperatures of consecutive first and second frames; determining, through a controller, a difference between the obtained color temperatures and comparing the differences to preset values, and adjusting a color distribution of a display based on the comparison between the color temperatures and the preset values. The controller may obtain the color temperature of the consecutive first and second frames of the image signal from meta information of the image signal.

BRIEF DESCRIPTION OF THE DRAWINGS

The above and/or other aspects will become apparent and more readily appreciated from the following description of the exemplary embodiments, taken in conjunction with the accompanying drawings, in which.

DETAILED DESCRIPTION OF EXEMPLARY EMBODIMENTS

Figure 1:
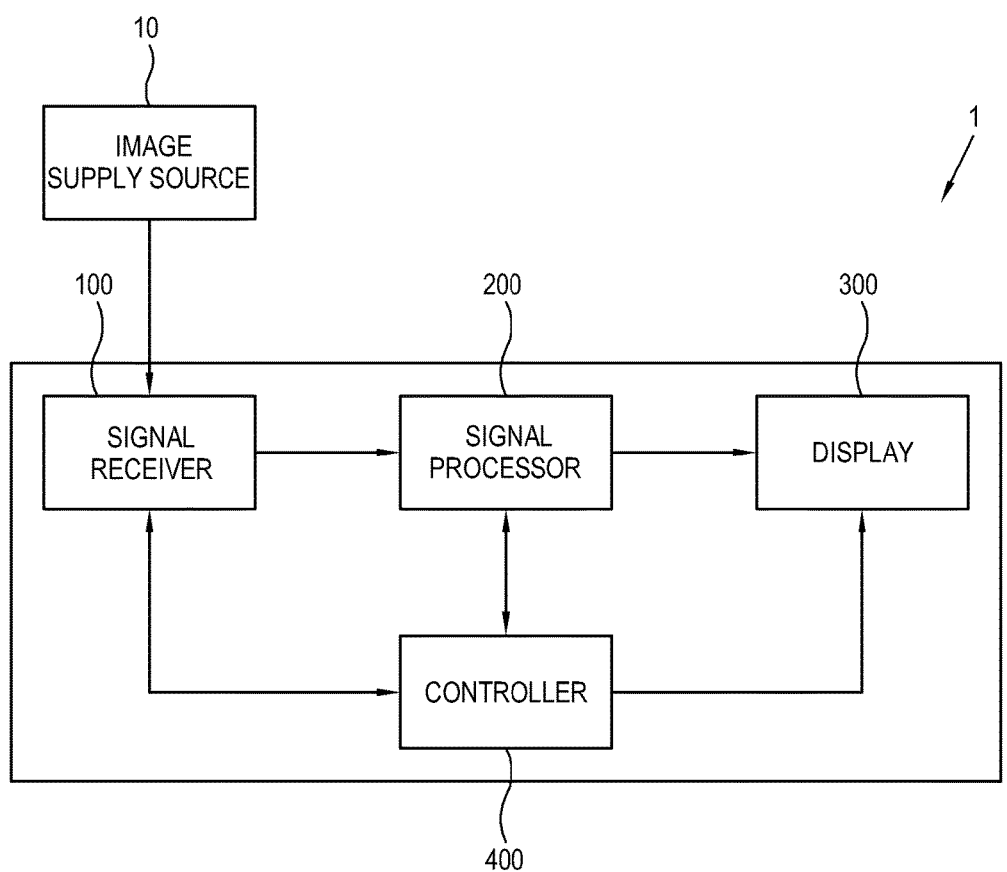
FIG. 1 is a block diagram of a display apparatus according to an exemplary embodiment.

Below, exemplary embodiments will be described in detail with reference to the accompanying drawings so as to be easily understood by a person having ordinary knowledge in the art. The exemplary embodiments may be embodied in various forms without being limited to the exemplary embodiments set forth herein. Descriptions of well-known parts are omitted for clarity, and like reference numerals refer to like elements throughout.

FIG. 1 is a block diagram of a display apparatus 1 according to an exemplary embodiment.

As shown therein, a display apparatus 1 includes a signal receiver 100 which receives an image signal from the outside, a signal processor 200 which processes the image signal received by the signal receiver 100, according to a preset image processing operation, a display 300 which displays an image thereon based on the image signal processed by the signal processor 200, and a controller 400 which controls overall operations of the display apparatus 1.

The display apparatus 1, according to an exemplary embodiment may be implemented as a TV, but is not limited thereto. For example, the inventive concept may apply to a device which may display an image based on an image signal supplied by an image supply source 10, e.g., to the display apparatus 1, which is implemented as various devices such as a portable multimedia player (PMP) and a mobile phone.

The image supply source 10 supplies an image signal to the display apparatus 1 in a wired/wireless manner. The image supply source 10 may generate such image signal by itself or may store therein an image signal generated by another electronic apparatus (not shown). In the former case, the image supply source 10 may be implemented as a shooting camera (not shown) or by a camcorder (not shown). In the latter case, the image supply source 10 may be implemented as a computer main body (not shown) which includes a central processing unit (CPU) (not shown) and a graphic card (not shown) which generates and locally provides an image signal, a server (not shown) which provides an image signal in a network, or a transmission apparatus (not shown) of a broadcasting station which transmits a broadcasting signal by airwave or by cable.

Hereinafter, each element of the display apparatus 1 will be described.

The signal receiver 100 transmits image signals/image data from the image supply source 10 to the signal processor 200. The signal receiver 100 may vary depending on a standard of a received image signal and the type of apparatus embodied as the display apparatus 1. For example, the signal receiver 100 may receive a radio frequency (RF) signal in a wireless manner from a broadcasting station (not shown), or may receive an image signal in a wired manner according to composite video, component video, super video, SCART, high definition multimedia interface (HDMI), DisplayPort, unified display interface (UDI) or wireless HD standard.

The signal receiver 100 may receive image data through a local connection method such as universal serial bus (USB) or may receive image data packet from a server (not shown) through a network. The signal receiver 100 may include a tuner to tune an image signal in response to the image signal being a broadcast signal.

The signal processor 200 processes an image signal received by the signal receiver 100, according to various image processing operations. The signal processor 200 outputs the processed image signal to the display 300, on which an image is displayed on the basis of the image signal.

The image processing operation of the signal processor 200 may include, but is not limited to, a decoding operation which corresponds to an image format of image data, a de-interlacing operation which converts interlace image data into progressive image data, a scaling operation which adjusts image data to a preset resolution, a noise reduction operation which improves an image quality, a detail enhancement operation, a frame refresh rate conversion, etc.

The signal processor 200 may be implemented as a system-on-chip (SOC) which integrates the foregoing functions, or as an image processing board (not shown) which is formed by mounting individual elements performing the foregoing functions independently, and is mounted in the display apparatus 1.

The display 300 displays an image thereon based on image data output by the signal processor 200. The display 300 according to an exemplary embodiment includes a display panel (not shown) which emits light by itself, such as an organic light emitting diode (OLED).

Figure 2:
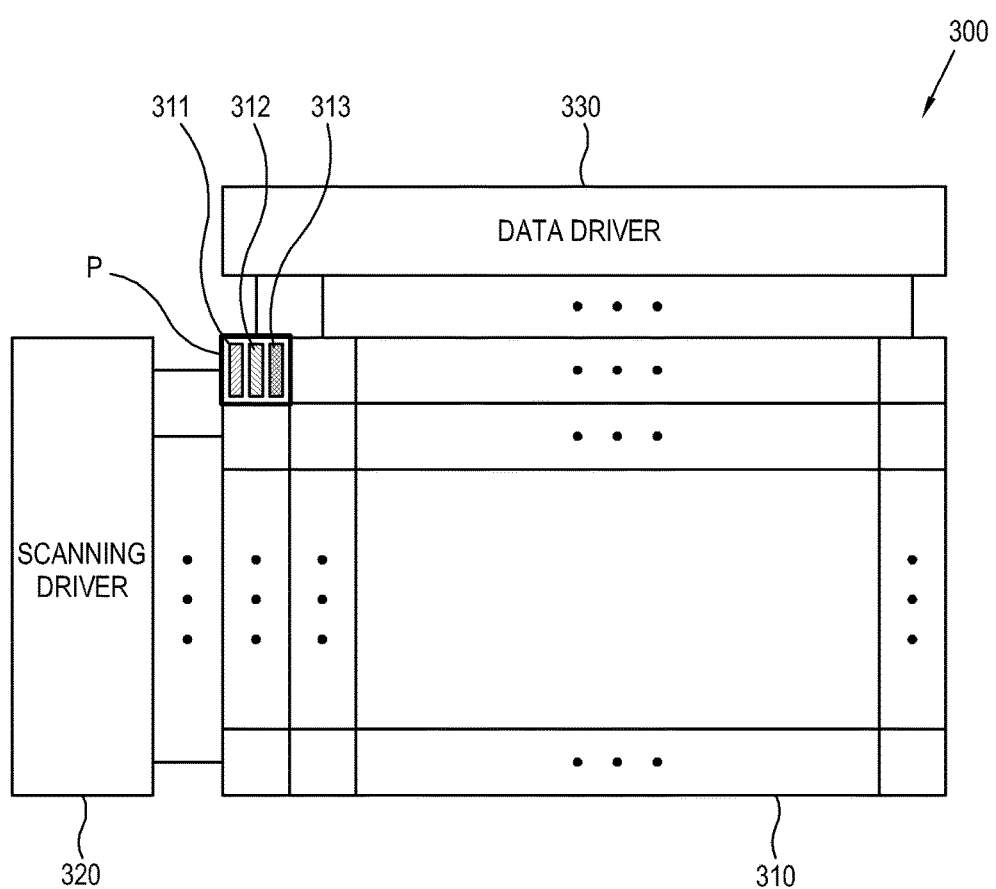
FIG. 2 illustrates an example of an operational mode of a display of the display apparatus in FIG. 1.

Hereinafter, a configuration of the display 300 will be described with reference to FIG. 2. FIG. 2 briefly illustrates an operational mode of the display 300.

As shown therein, the display 300 includes a display panel 310 in which a plurality of pixels P is arranged in a matrix, and a scanning driver 320 and a data driver 330 which are connected to the display panel 310 and drive the display panel 310 according to a signal from the signal processor 200 and the controller 400.

The scanning driver 320 applies a gate voltage to each line of the pixels P, and the data driver 330 receives an image signal from the signal processor 200, and converts the received image signal into a data voltage per pixel and applies the data voltage to each column of the pixels P. Through the voltage applied by the scanning driver 320 and the data driver 330, a current flows in light emitting elements 311, 312 and 313 per pixel P, and thus an image is displayed on the display panel 310.

Each pixel P includes light emitting elements 311, 312 and 313 which generate light in a plurality of colors, e.g., RGB colors. The light in the RGB colors generated by the light emitting elements 311, 312 and 313 is mixed to form white light which displays an image on the display panel 310.

The controller 400 controls the display 300 to display an image on the display 300 based on the image signal processed by the signal processor 200. For example, the controller 400 transmits a control signal to the display 300 to control emission/non-emission of light from the light emitting elements 311, 312 and 313, and according to the control signal, a driving voltage is applied to the light emitting elements 311, 312 and 313, per pixel P.

However, the image signal supplied by the image supply source 10 may have various color feature conditions based upon the conditions at the time of initial generation. For example, an image which is photographed by a camera may have various color reproduction features, depending on the features of the camera, or a light state of the environment in which the image is photographed.

The color reproduction feature means a color feature of an image which appears when a predetermined image signal/image data are processed to display an image, and e.g., includes a color gamut, and a color temperature which is designated within the color gamut.

The color gamut refers to, within a color space showing a color scope recognizable by a human, the maximum color scope which may be expressed by a device displaying an image such as the display apparatus 1 or by a device which generates an image such as a camera (not shown). That is, a wide color gamut means there are a number of colors expressed by the device.

The color temperature means an expression of color represented by using the Kelvin (K) scale. A predetermined color that is closer to red has a lower color temperature, and a predetermined color that is closer to blue color has a higher color temperature.

In a related art, the display apparatus 1 displays an image according to inherent color reproduction feature of the display panel 310 or according to a preset feature value of the display apparatus 1 based on the processed image signal. For example, in response to the display panel 310 having a color temperature set to 10000K, the display apparatus 1 processes the image signal to be reproduced as 1000K color temperature, to be displayed as an image.

However, as explained above, the image signal which is processed by the display apparatus 1, has various color reproduction features, according to the environment under which the image is generated. For example, even in response to images having been photographed by the same camera (not shown), an image which is photographed in the evening will have a lower color temperature as the color feature than if the image were photographed at dawn. Otherwise, even in response to images having been photographed at the same time, the images may have different color temperatures or a different color gamut, depending on the camera (not shown).

Figure 3:
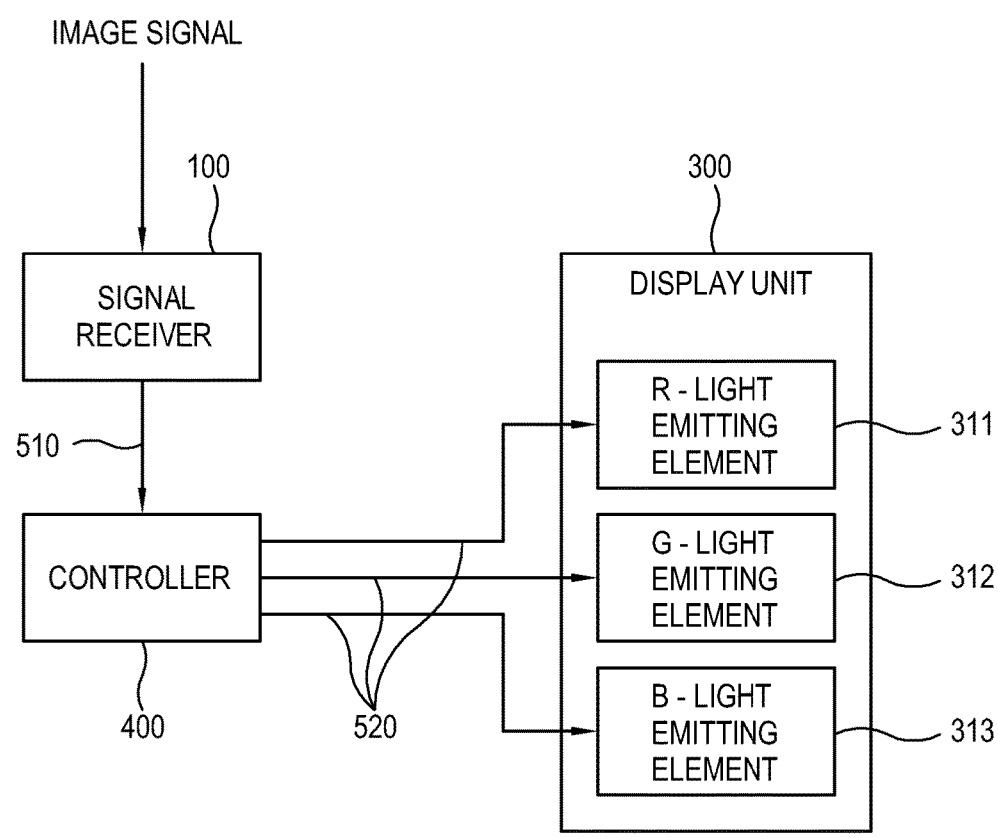
FIG. 3 is a block diagram showing an operational structure of a controller of the display apparatus in FIG. 1.

Accordingly, an exemplary embodiment suggests the following method:

FIG. 3 is a block diagram showing an operational structure of the controller 400.

As shown therein, the controller 400 analyzes an image signal received by the signal receiver 100, and obtains color reproduction feature information of the image signal (510). For example, the controller 400 may obtain each pixel value of an image frame of the image signal, determine color distribution within the image frame from the pixel value to thereby determine the value of the color temperature of the image frame or image signal. Otherwise, the controller 400 may obtain the color temperature or color gamut of the image signal from meta information included in a header of the image signal.

The controller 400 according to an exemplary embodiment obtains the color reproduction feature information at the time when the signal receiver 100 receives the image signal, but such time does not limit the inventive concept. For example, the controller 400 may obtain the color reproduction feature information of the image signal at the time when the image signal is transmitted to the signal processor 200 or when the image signal is processed by the signal processor 200.

Upon obtaining the color reproduction feature information of the image signal, the controller 400 changes the color distribution of light generated by the display 300 so that the display 300 displays an image thereon in a color which corresponds to the obtained information, based on the image signal.

Specifically, the controller 400 adjusts a voltage applied to the light emitting elements 311, 312 and 313 per RGB color to thereby individually control the light emitting quantity or light emitting level of the light emitting elements 311, 312 and 313, per color (520). For example, in response to a determination that the color temperature of the image signal is low, the controller 400 may increase the light emitting quantity of the light emitting element 311 generating a red color light of the light emitting elements 311, 312 and 313. Otherwise, in response to a determination that the color temperature of the image signal is high, the controller 400 may increase the light emitting quantity of the light emitting element 313, generating a blue color light of the light emitting elements 311, 312 and 313.

To control the distribution of the light emitting quantity of the light emitting elements 311, 312 and 313, (i) the light emitting quantity of one of the light emitting elements 311, 312 and 313 may be increased relatively, or (ii) the light emitting quantity of one of the light emitting elements 311, 312 and 313 may be decreased relatively, or both of (i) and (ii) above may be used.

Based on the pixel value of the image signal, the controller 400 may obtain a brightness level of the image signal together with color reproduction feature information of the image signal. The controller 400 may change the distribution of the light emitting quantity of the light emitting elements 311, 312 and 313 by taking into account the brightness level of the image signal. That is, when controlling the light emitting quantity of the light emitting elements 311, 312 and 313, the controller 400 may adjust the light emitting quantity of each of the light emitting elements 311, 312 and 313 in order to display an image consistent with the brightness level of the image signal.

Figure 4:
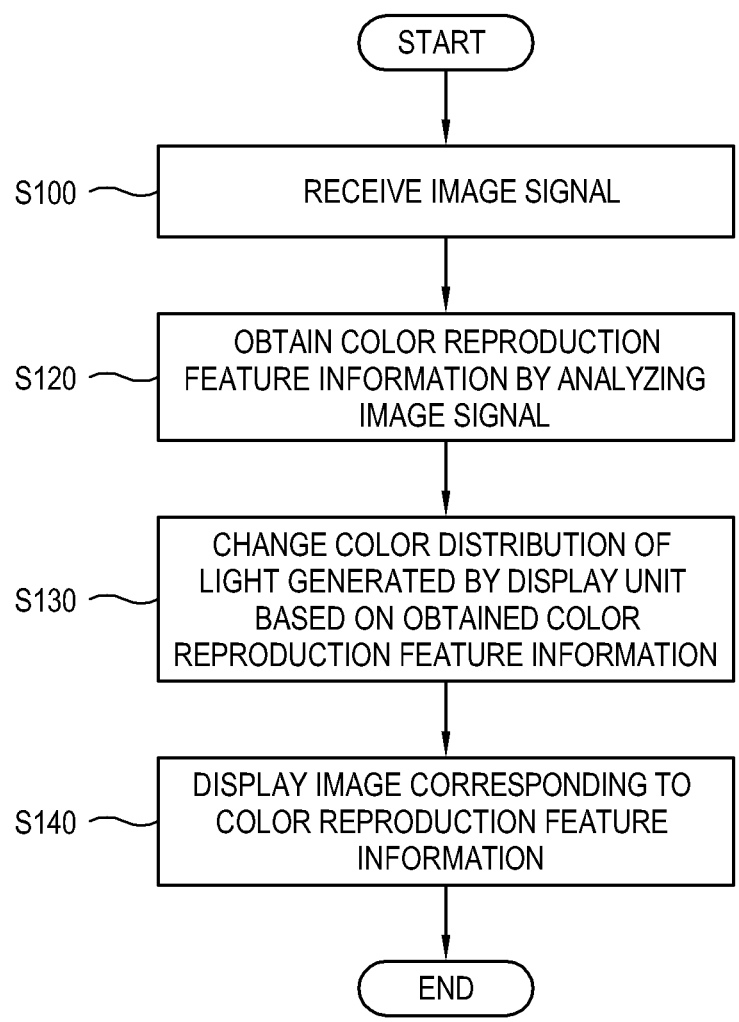
FIG. 4 is a control flowchart showing a method of controlling the display apparatus in FIG. 1.

Hereinafter, a method of controlling the display apparatus 1 according to an exemplary embodiment will be described with reference to FIG. 4. FIG. 4 is a control flowchart which shows the control process.

As shown therein, upon receiving an image signal (S100), the display apparatus 1 analyzes the image signal and obtains the color reproduction feature information of the image signal (S110).

The display apparatus 1 changes the color distribution of light generated by the display 300 according to the obtained color reproduction feature information (S120), and displays an image (S130) which reproduces an image in a color which corresponds to the obtained color reproduction feature information, based on the image signal.

Consequently, the display apparatus 1 may display an image which corresponds to the color reproduction feature of the image signal.

According to the exemplary embodiment explained above, the display apparatus 1 may obtain the color temperature of two consecutive image frames and may display the image frames in compliance with the color temperature. However, in response to the color temperature of the two consecutive image frames having significant differences, a viewer may feel tired after viewing the images.

Figure 5:
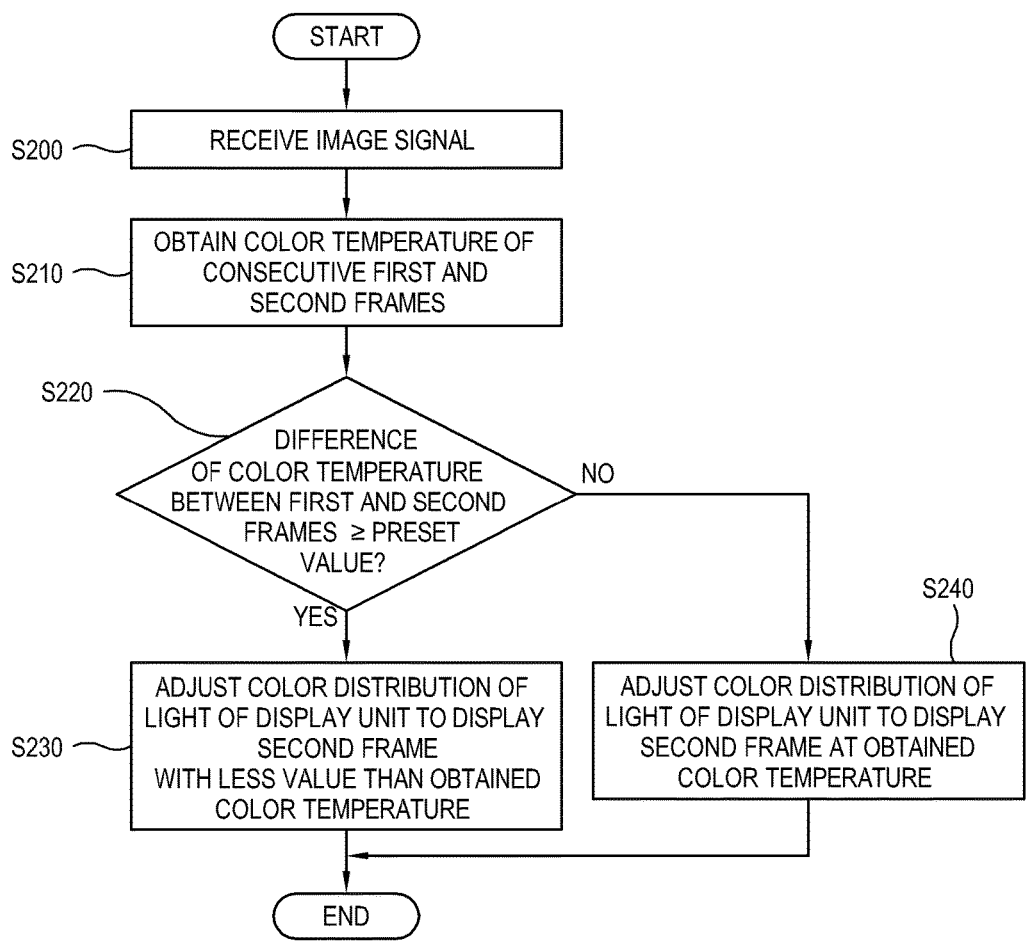
FIG. 5 is a control flowchart showing a method of adjusting a difference of color temperature between two consecutive image frames of the display apparatus of FIG. 1.

FIG. 5 is a control flowchart of a method for adjusting a difference of color temperature between the two consecutive image frames.

As shown therein, upon receiving the image signal (S200), the display apparatus 1 obtains consecutive color temperatures of a first frame and a second frame (S210).

The display apparatus 1 compares the color temperatures of the first and second frames, and determines whether the difference of the color temperatures is at or above a preset value (S220).

In response to a determination that the difference of the color temperatures is a preset value or more, the display apparatus 1 adjusts the color distribution of light of the display 300 to display the second frame with a lower color distribution value than the obtained color temperature (S230). The lower value than the obtained color temperature is not a limited figure and various values may be increased or decreased with respect to the obtained color temperature.

In response to a determination that the difference of the color temperatures is less than a preset value, the display apparatus 1 adjusts the color distribution of the light of the display 300 in order to display the second frame with the obtained color temperature (S240).

For example, in response to the color temperature of the first frame being 3000K, the color temperature of the second frame is 8000K and the difference of the preset color temperature is 4000K, the difference of the color temperatures between the first and second frames is 5000K, which exceeds the preset value of 4000K.

Thus, the display apparatus 1 may adjust the color temperature of the second fame to a lower value such as 7000K or 6000K in order for a viewer to be less tired due to the drastic change of the color temperature, when viewing the first and second frames.

Although a few exemplary embodiments have been shown and described, it will be appreciated by those skilled in the art that changes may be made in these exemplary embodiments without departing from the principles and spirit of the invention, the range of which is defined in the appended claims and their equivalents.

What is claimed is:

1. A display apparatus comprising:
a display which comprises a plurality of lighting elements to generate light in red (R), green (G) and blue (B) colors and which displays an image;
a signal receiver which receives an image signal;
a signal processor which processes the image signal; and
a controller which obtains color temperatures of consecutive first and second frames of the image, the color temperatures corresponding to an environment of when the image signal is generated, determines a difference between the color temperatures of the consecutive first and second frames of the image, compares the difference of the color temperatures with a preset value, and in response to determining that the difference of the color temperatures is equal to or more than the preset value, adjusts a color distribution of light for the second frame to display the second frame with a lower color distribution value than the obtained color temperature, and in response to determining that the difference of the color temperatures is less than the preset value, adjusts the color distribution of the light for the second frame to display the second frame with the obtained color temperature,
wherein the controller obtains the color temperatures of the consecutive first and second frames of the image at the time when the signal receiver receives the image signal.

2. The display apparatus of claim 1, wherein the controller analyzes the color temperatures of the consecutive first and second frames of the image signal based on a pixel value of a frame of the image signal.

3. The display apparatus of claim 2, wherein the controller obtains each pixel value of an image frame of the image signal, determines color distribution within the image frame from the pixel value to thereby determine the value of the color temperature of the image frame.

4. The display apparatus of claim 1, wherein the controller obtains the color temperatures of the consecutive first and second frames of the image signal from meta information of the image signal.

5. The display apparatus of claim 4, wherein the meta information is included in a header of the image signal.

6. The display apparatus of claim 1, wherein
the color temperatures of the consecutive first and second frames come from a color gamut, within which the color temperatures are designated.

7. The display apparatus according to claim 1, wherein the display comprises a display panel which emits light by itself.

8. The display apparatus according to claim 1, wherein the controller performs an operation of adjusting the color distribution of the image based on the comparison between the difference of the color temperatures and the preset value according to a user's input.

9. The display apparatus according to claim 1, wherein the color temperatures of the consecutive first and the second frames are determined by an electronic device which generates the image signal by photographing and by a light state in an environment in which the photographing is conducted.

10. The display apparatus according to claim 1, wherein the controller controls the plurality of lighting elements of the display to change a light emitting level or a light emitting quantity of each light emitting element with respect to the second frame according to the comparison between the difference of the color temperatures and the preset value.

11. The display apparatus according to claim 1, wherein the display comprises an OLED panel.

12. The display apparatus of claim 1, wherein the color temperature is expressed in Kelvin (K).

13. A method of controlling a display apparatus, the method comprising:

receiving an image signal;

processing the received image signal; and through a controller, obtaining color temperatures of consecutive first and second frames of the image, the color temperatures corresponding to an environment of when the image signal is generated, determining a difference between the color temperatures of the consecutive first and second frames of the image, comparing the difference of the color temperatures with a preset value, in response to determining that the difference of the color temperatures is equal to or more than the preset value, adjusting a color distribution of light for the second frame to display the second frame with a lower color distribution value than the obtained color temperature, and in response to determining that the difference of the color temperatures is less than a preset value, adjusting a color distribution of light for the second frame with the obtained color temperature, wherein the controller obtains the color temperatures of the consecutive first and second frames of the image at the time when the signal receiver receives the image signal.

14. The method of claim 13, wherein the controller obtains the color temperatures of the consecutive first and second frames of the image signal from meta information of the image signal.

15. The method according to claim 13, wherein the display comprises a display panel which emits light by itself.

16. The method according to claim 13, wherein the color temperatures of the consecutive first and the second frames are determined by an electronic device which generates the image signal by photographing and by a light state in an environment in which the photographing is conducted.

17. The method according to claim 13, wherein the plurality of lighting elements of the display is controlled to change a light emitting level or a light emitting quantity of each light emitting element with respect to the second frame according to the comparison between the difference of the color temperatures and the preset value.

18. The method according to claim 13, wherein the display comprises an OLED panel.

* * * * *